(12) United States Patent
Bryant

(10) Patent No.: US 7,389,865 B1
(45) Date of Patent: Jun. 24, 2008

(54) CHUTE FOR TRANSPORTING SLUDGE IN A WASTEWATER TREATMENT SYSTEM

(75) Inventor: Michael I. Bryant, Thomasville, NC (US)

(73) Assignee: BGF Industries, Inc., Greensboro, NC (US)

(*) Notice: Subject to any disclaimer, the term of this patent is extended or adjusted under 35 U.S.C. 154(b) by 0 days.

(21) Appl. No.: 11/746,241

(22) Filed: May 9, 2007

(51) Int. Cl.
*B65G 11/20* (2006.01)

(52) U.S. Cl. .................. 193/32; 193/2 R; 193/25 R; 193/28; 198/562

(58) Field of Classification Search .............. 193/2 R, 193/25 A, 28, 32, 2 A; 198/550.4, 560, 562
See application file for complete search history.

(56) References Cited

U.S. PATENT DOCUMENTS

| | | | | |
|---|---|---|---|---|
| 3,732,961 A | * | 5/1973 | Thornton et al. ........... | 193/25 R |
| 3,986,811 A | * | 10/1976 | Gunnels, Jr. ............... | 193/25 R |
| 4,332,516 A | * | 6/1982 | Nakahara et al. ........... | 193/32 |
| 4,476,670 A | * | 10/1984 | Ukai et al. .................. | 193/32 |
| 4,778,031 A | * | 10/1988 | Curiel ....................... | 193/25 R |
| 5,109,970 A | * | 5/1992 | Zaborszki ................... | 193/2 R |

* cited by examiner

*Primary Examiner*—James R Bidwell
(74) *Attorney, Agent, or Firm*—C. Robert Rhodes, Esq.; Womble Carlyle Sandridge & Rice PLLC

(57) ABSTRACT

An abrasion resistant and chemical resistant damper is provided for installation in the sludge transport section of a wastewater treatment system of the type having a damper inlet chute and a damper outlet chute and a damper between the damper inlet chute and the damper outlet chute. The damper is formed from a fabric woven substantially of yarns of high performance material selected from the group consisting of aramid, ultra-high molecular weight polyethylene, and liquid crystal polymer. The damper includes a body having an inlet end and an outlet end, whereby the body creates a volume for sludge to move through. An inlet flange is formed about the inlet end and an outlet flange is formed about the outlet end.

12 Claims, 5 Drawing Sheets

CHUTE FOR TRANSPORTING SLUDGE IN A WASTEWATER TREATMENT SYSTEM

FIELD OF THE INVENTION

The present invention relates generally to wastewater treatment systems, and, more particularly, to a damper for a sludge chute configured to transport substantially solid waste, or sludge, that is removed during the treatment of wastewater.

BACKGROUND OF THE INVENTION

The passage of the Clean Water Act in 1972 led to a boom in the construction of municipal wastewater treatment facilities needed to meet at least the minimum levels of treatment for the national drinking water supply.

A typical wastewater treatment plant comprises two treatment operations: a primary treatment, and a secondary treatment. The primary, or initial, treatment involves the removal of solids from an incoming waste stream. Larger objects are typically removed by "bar" screens, allowing smaller suspended and floating solids to pass. Downstream, scrum and grit may be removed before the remaining solids are permitted or forced to settle out in a primary settling tank. To accumulate and maximize the separation and settling of solids, a centrifuge-type action may be employed in connection with the settling tank. The accumulated solids, or "sludge," are then carried away for treatment or disposal, while the remaining liquid is transported for secondary treatment involving aeration, activation, chemical treatment, etc.

The sludge that is removed from the wastewater is diverted from the settling tank in the primary treatment system to a conveyor or repository in the sludge treatment system for subsequent processing of the solids. The interconnection between the two systems (primary and sludge treatment) for transport of the sludge may be in the form of piping or ductwork. Due to the movement and vibration of rotating and other processing equipment (vibrators, air handlers, conveyors, etc.) in operating mechanical plant systems, some type of device is provided between certain interconnected components to dampen the vibration and inherent movement of mechanical components to protect the interconnected equipment and systems from damage. In a municipal wastewater treatment plant, the interconnection between sludge transport components is often in the form of a damper placed in-line between the inlet chute that is delivering sludge from a settling tank or basin, and the outlet chute that delivers the sludge to the conveyors or pumps that move the sludge to the sludge treatment system.

For many years, the damper that interconnects the inlet and outlet sludge chutes has been constructed of a heavy, reinforced solid, natural or butyl rubber. This rubber damper comprises an inlet flange, and outlet flange, and a flexible, sometimes bellows-like, body between the flanges. The body provides an open volume through which the sludge passes. While the heavy rubber construction is somewhat resistant to abrasion and harsh chemical exposure, it nonetheless requires routine maintenance, or replacement within the first several thousand hours of use. Even under the most favorable operational conditions, natural and butyl rubber damper constructions rapidly deteriorate, dry rot, and crack, requiring frequent repair (patching) or replacement that require the wastewater system to be removed from operation. The repair and/or replacement work unfortunately dictates loss of operational capacity with significant resulting costs.

SUMMARY OF THE INVENTION

An aspect of the present invention is directed to a more chemical resistant and more abrasion resistant damper for installation in the sludge transport section of a wastewater treatment system of the type that diverts separated sludge away through a sludge inlet chute and into a sludge outlet chute. The damper interconnects the sludge inlet chute and the sludge outlet chute. In some wastewater treatment operations, the damper is also known as a "centrifuge boot."

While it has long been believed that dampers for the wastewater treatment conditions described herein must be constructed of heavy, impermeable solid materials such as rubber, surprisingly it has now been found that a durable, abrasion and chemical resistant damper for this service may be formed from a much lighter in weight high performance fabric. Fabrics are generally not known for such durability or resistance to permeation. More particularly, in one embodiment the chemical resistant and abrasion resistant damper is formed of a tightly woven fabric formed from fibers of high performance yarns such as ultra-high molecular weight polyethylene fibers (commercially available as SPECTRA®), aramid fibers (commercially available as KEVLAR®), and/or liquid crystal polymer fibers (commercially available as VECTRAN®).

The chemical and abrasion resistant damper includes a body having an inlet end and an outlet end that form an open volume. An inlet flange is formed about the periphery of the inlet end and an outlet flange is formed about the outlet end. The inlet and outlet flanges may be formed for mating engagement with corresponding flanges on the sludge inlet and outlet chutes.

Another aspect of the present invention is directed to a sludge chute assembly for a wastewater treatment system. In one embodiment, the assembly includes a sludge inlet chute for channeling sludge downwardly from a sludge settling operation, and a sludge outlet chute for channeling sludge downwardly to a sludge processing operation. A chemical and abrasion resistant damper as described above interconnects the inlet and outlet chutes.

These and other features and aspects of the invention will become more apparent upon review of the detailed description set forth below when taken in conjunction with the accompanying drawing figures, which are briefly described as follows.

DESCRIPTION OF THE PREFERRED EMBODIMENTS

Definitions

"Wastewater" refers to water, and solid or dissolved matter therein, that has been previously used for domestic and/or industrial purposes and which may include sewage, disposal, runoff, industrial and agricultural wastes.

"Primary treatment" refers to the first stage or wastewater treatment that removes settleable or floating solids only.

"Secondary treatment" refers to the stage of treatment that converts dissolves and suspended pollutants into a form that can be removed, producing a relatively highly treated effluent.

"Settling tank (also known as a sedimentation tank or clarifier)" refers to a vessel in which solids settle out of water by gravity or force (such as centrifugal force).

"Sludge" refers to any solid, semi-solid, or liquid waste that settles to the bottom of the settling, or sedimentation, tank.

Figure 1:
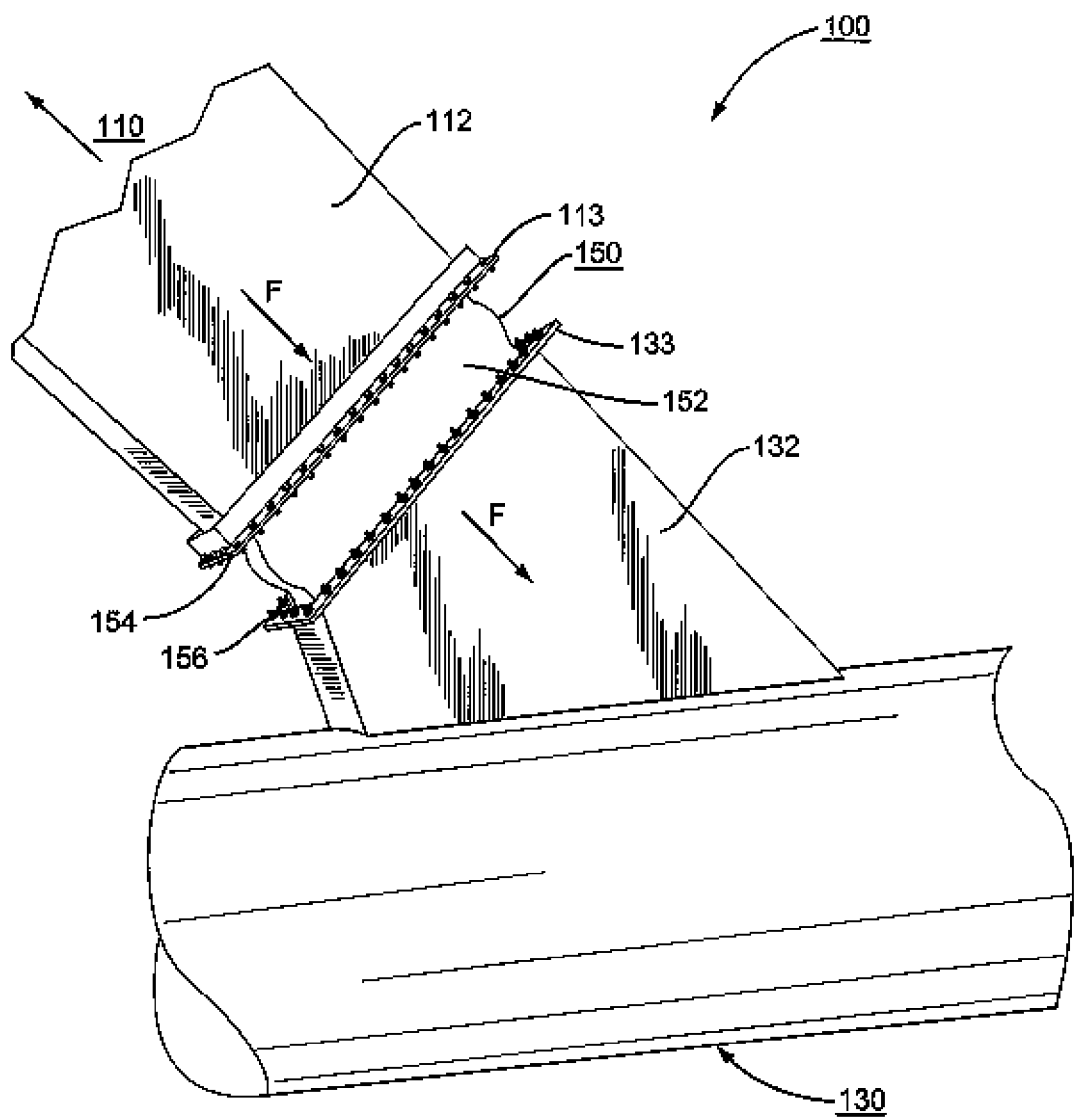
FIG. 1 (Prior Art) is a perspective view of a municipal sludge conveyor chute with installed damper.
Figure 2:
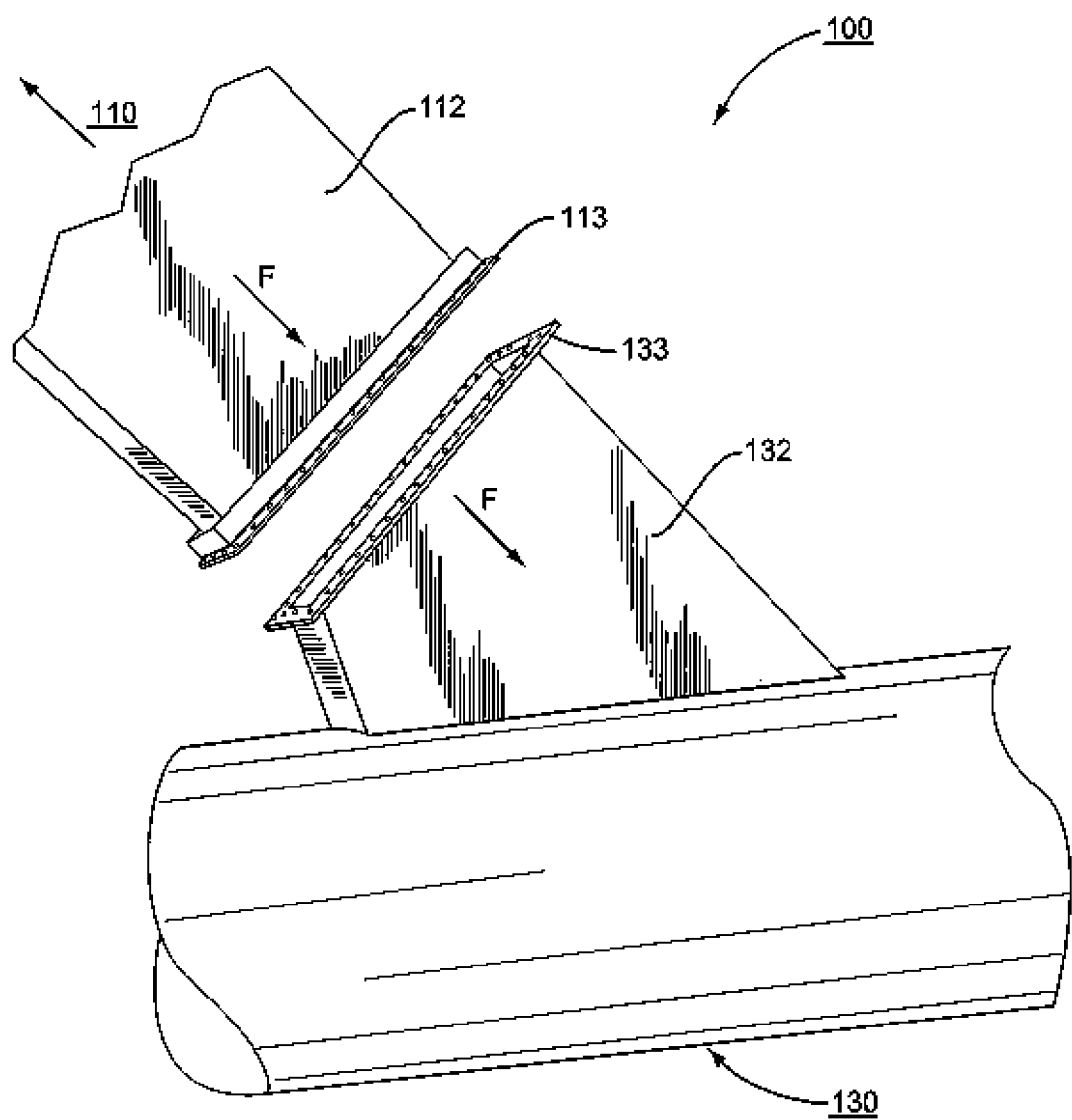
FIG. 2 (Prior Art) is a perspective view of the municipal sludge conveyor chute of FIG. 1 with the damper removed.

Referring now in more detail to the Figures, and first to FIGS. 1 and 2, a typical (prior art) sludge chute construction for a wastewater treatment system is shown generally as 100. The sludge chute construction comprises a damper inlet chute 112 in material (sludge) communication with an upstream settling or sedimentation tank 110 (not shown), a damper outlet chute 132 that is in material (sludge) communication with a downstream sludge transport or sludge conveyor 130, and a damper 150 interconnecting the inlet chute 112 and the outlet chute 132. The damper is designed to be somewhat flexible and resilient so that is may absorb or buffer the vibration and movement of components of the mechanical systems comprising the upstream settling operation and the downstream sludge conveyor. Thus, the damper not only serves as a conduit for the movement of sludge therethrough, but also protects the interconnected systems from interactive damage due to the effects of vibration, rotating machinery, expansion and contraction of system components, etc.

The damper 150 shown in FIG. 1 is formed of a heavy, thick rubber, either natural or synthetic. Natural rubber is formed of a hydrocarbon polymer, while butyl rubber is a synthetic elastomer having physical properties similar to natural rubber. Both types of rubber, however, are relatively heavy and bulky when formed into components for commercial or industrial applications. The damper 150 comprises a body 152 that is a generally rectangular box-like volume having opposed side walls and open ends. Flanges 154, 156 at the open ends of the body are formed and shaped for mating engagement with corresponding flanges 113 and 133 of the damper inlet chute 112 and damper outlet chute 132, respectively.

Referring now to FIG. 2, the sludge chute construction is shown with the damper 150 removed. This is the state of the sludge transport system when the damper 150 must be removed for repair or replacement, as the in situ maintenance of dampers is not feasible.

Having described the overall sludge chute construction 100 in general, one embodiment of the chemical and abrasion resistant damper 250 of the present invention will now be described in detail. The inventors have found that a superior damper may be formed from a lightweight, fabric woven from yarns of certain high performance, high strength fibers or filaments. One suitable high performance, high strength fiber or filament is Ultra-High Molecular Weight Polyethylene (UHMWPE), also known as high modulus polyethylene or high performance polyethylene. This generic chemical family is characterized as a very tough thermoplastic material having a high level of impact strength. It is highly resistant to corrosive chemicals, has low moisture absorption, a very low coefficient of friction, and is self-lubricating. Fibers formed from this thermoplastic are also highly resistant to abrasion (up to 10 times more resistant to abrasion than carbon steel). Commercially, UHMWPE is available as SPECTRA® or DYNEEMA®.

Another suitable high performance fiber or filament is liquid crystal polymer (LCP). LCP is formed of polymer molecules that are melt extruded into thermotropic fibers and subsequently formed into yarns. LCP fibers or filaments have excellent mechanical properties, including superior abrasion resistance and resistance to many harsh chemicals. Commercially, LCP is available as VECTRAN®.

Yet another suitable high performance, high strength fiber or filament is derived from the aramid family of synthetic materials. Commercially available as KEVLAR®, this material is formed from a poly-para-phenylene terephthalamide, which is a very strong nylon-like polymer. KEVLAR® fibers, filaments, and yarns formed therefrom, are five times stronger than steel per unit weight, have a high tenacity, are highly abrasion resistant, and are resistant to harsh chemical attack.

It is contemplated that various other high performance, high strength, high tenacity, and/or high elastic modulus fibers, filaments, yarns, and fabric constructions will produce suitable fabrics within the scope of the present invention. While the embodiments described in detail herein comprise woven fabrics formed substantially from yarns of high performance fibers and filaments, it is contemplated that yarns comprising more conventional, and less expensive materials such as polyester, nylon, acrylic, fiberglass, cotton, etc. may form some minor portion of the total fabric construction. The actual compositions of the yarns forming the woven fabric is dependent upon the service for which the dampers are intended. For example, where lower levels of abrasion or lower levels of harsh chemical exposure are anticipated, minor portions of less abrasion resistant, less expensive materials may be used in combination with the high performance materials.

Figure 3A:
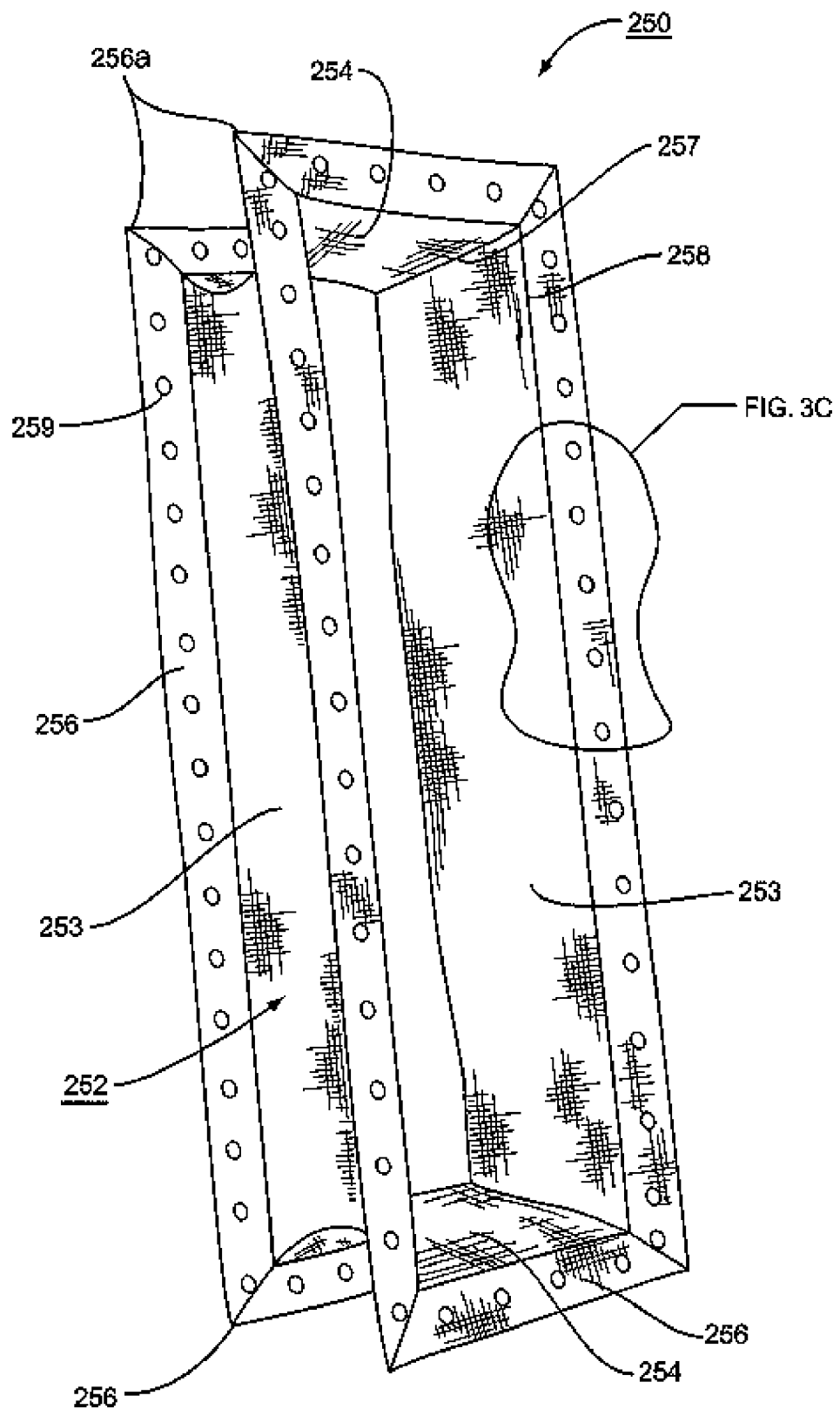
FIGS. 3A through 3C are perspective views of two embodiments of the damper of the present invention.

Turning now to FIG. 3A, one embodiment of the damper 250 of the present invention is shown. In this and the other embodiments described herein, one fabric found suitable for the damper constructions is a woven Kevlar fabric available from BGF Industries, Inc. of Greensboro, N.C. as Style No. 5745. This fabric is woven as a plain weave of 3000 denier Kevlar 29 yarns in both the warp and fill directions. The physical and chemical properties of these and similar yarns are well-known. It has been found by applicant, however, that the tight weave construction of this fabric minimizes openings between yarns and therefore limits or prevents leakage or seepage through the fabric layer during anticipated operational conditions. Thus, this fabric has a yarn end and yarn pick count of 17×17 which results in a single layer fabric that is about 0.025 inches thick with a weight of about 14 ounces per square yard. Testing has shown that the breaking strength of this fabric is about 1,250 pounds per inch in the warp direction and about 1,400 pounds in the fill direction. As those skilled in the material and textiles arts will readily appreciate, the fabric need not be limited to a particular weave, yarn size, thickness or weight to perform satisfactorily for the embodiments contemplated herein; rather, an important feature of the fabric is the lightweight, high performance yarns of the types described above in a tightly woven fabric.

As shown in FIG. 3A, this embodiment of the damper 250 comprises a body 252 having opposed, affixed flanges 256. The body portion, with a substantially rectangular cross-section which defines an open volume, includes opposed side walls 253, 254. When constructed, the opposed side walls 253, 254 thus form a box-like structure. While there are numerous ways in which the body 252 may be constructed, in the construction shown in FIG. 3A the side walls 253, 254 are cut from separate pieces of woven fabric and subsequently sewn together along seams 257 with a high strength thread such as a commercially available KEVLAR® thread. Alternatively, the body 252 may be formed from a single sheet of fabric that is wrapped into a rectangular shape and closed at a single seam. Similarly dimensioned flanges 256 are formed about the periphery of each open end of the body 252. The flanges 256 may be integral to the sides 253, 254, or may be separately cut and sewn to the edges of each open end of the body 252 along seams 258. In the damper construction shown in FIG. 3A, the flanges are continuous around the periphery of each open end with the sides and ends of each flange mating along a seam and terminating in a tapered corner 256a. Spaced-apart apertures 259 may be formed through each of the flanges 256 for attachment to the corresponding flanges 213, 233 of the damper inlet and outlet chutes 212, 232 of the sludge chute construction 100 with conventional fasteners such as bolts, or the like. Alternatively, the flanges 256 may be adhered to their corresponding sludge inlet and outlet flanges 213, 233 with suitable adhesives, or may be secured about the inlet and outlet flanges 213, 233 with ties, wraps, bands, tapes, etc. In another embodiment, the flanges 256 on the body itself may be eliminated altogether and the open ends of the damper affixed about the sludge inlet and outlet chutes.

Optionally, a coating or film (not shown) may be applied over the entire (inside and outside) surface areas of the damper or over selected areas as an additional measure to further prevent leakage or seepage through the fabric; however, it has been found that a high performance fabric constructed as described herein alone has a relatively low, and therefore acceptable, degree of porosity. In one embodiment, the woven fabric is subjected to a weave set. The weave set comprises padding the woven fabric with an acrylic emulsion and subsequently drying the fabric to cure the acrylic coating. For example, a soft acrylic emulsion comprising a 25 percent by volume solution of Rhoplex ST-954, available from Rhom and Hass is padded on the woven fabric and then dried for about one minute at about 350 degrees Fahrenheit. It has been found that this increases the fabric weight by only about 5 to 10 percent. Alternatively, a film of urethane, polyvinylchloride, or surlyn may be laminated to the fabric.

Figure 3B:
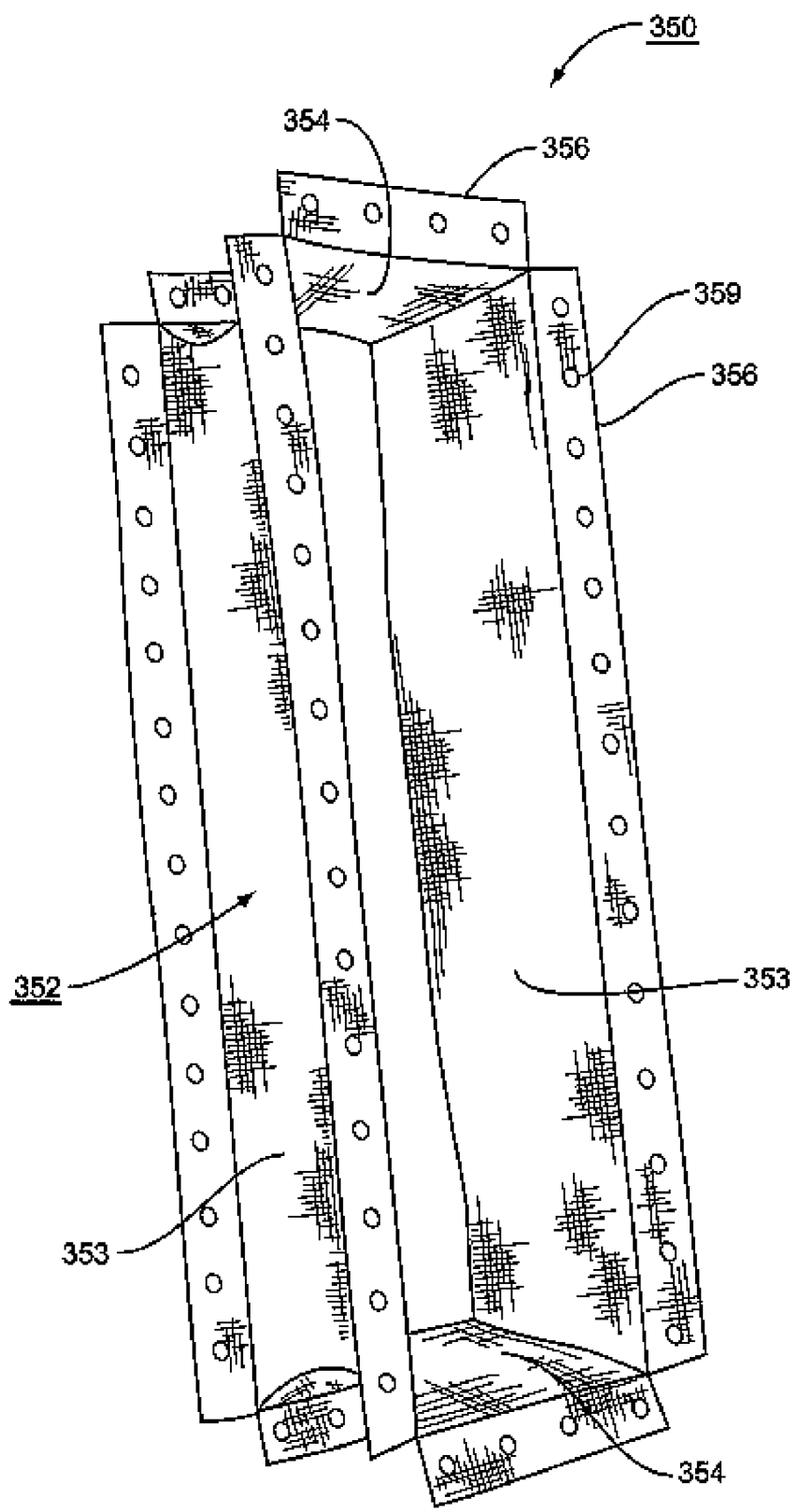

Another embodiment of the chemical and abrasion resistant damper 350 is illustrated in FIG. 3B. in this embodiment, the damper 350 also comprises a body 352 having opposed, affixed flanges 356. The body again includes opposed side walls 353, 354 that, when constructed, form a box-like structure having a generally rectangular cross-section. As in the embodiment described above, the body 352 may be constructed with side walls 353, 354 that are cut from separate pieces of fabric and subsequently sewn together along seams 357 with a high strength thread such as a commercially available KEVLAR® thread. Alternatively, the body 352 again may be formed from a single sheet of fabric that is wrapped into a rectangular shape and closed at a single seam. Similarly dimensioned flanges 356 are again formed about the periphery of each open end of the body 352. The flanges 356 may be integral to the separate pieces of fabric that form the four sides, and thus folded over to create flanges, or they may be separately cut as rectangular pieces and then sewn to the edges of each open end of the body 352 along seams 358. As shown in FIG. 3B, the flanges in this embodiment are not required to join at corners to form a single continuous peripheral flange 356; rather, each flange 356 comprises separate opposed flange flaps. Again also, spaced-apart apertures 359 may be formed through each of the flanges 356 for attachment to the corresponding flanges 113, 133 of the damper inlet 112 and outlet 132 chutes of the sludge chute construction 100. Again, an optional coating or film (not shown) may be applied to the inner and/or outer surfaces of the fabric layer to further limit seepage or leakage through the fabric.

Figure 3C:
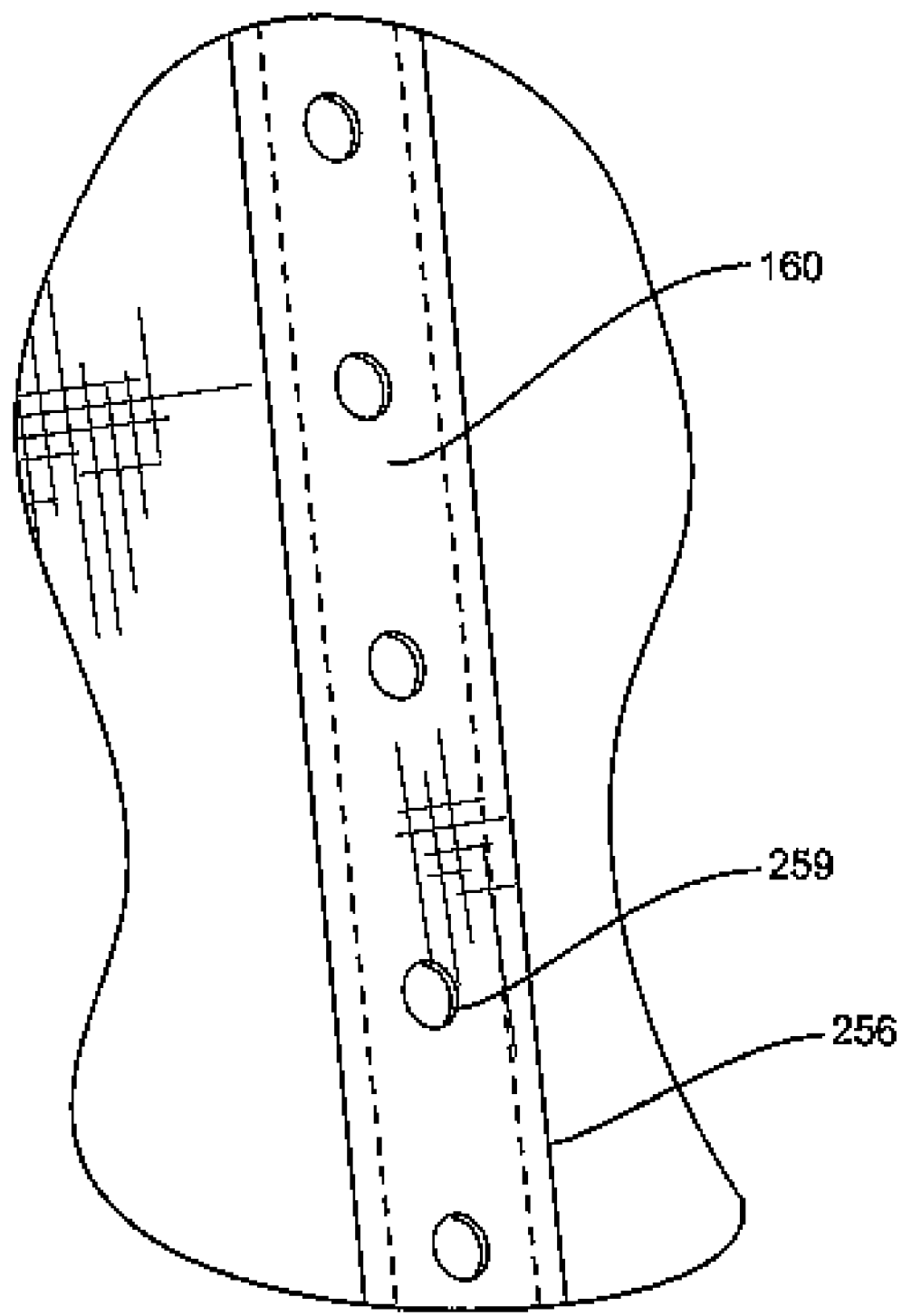

Turning lastly to FIG. 3C, a close-up view of one of the flanges 256, 356 of the damper 250, 350 of the present invention is shown in greater detail. As will be appreciated, materials used in applications such as the ones described herein are particularly susceptible to tearing and/or raveling at their points of attachment. For example, apertures areas, such as apertures 159, are more prone to tearing both during the initial punching or cutting of the apertures 159 through the fabric or as a result of movement and stress on the installed fabric. The inventors have found, however, that tearing and raveling may be minimized through the application of an overlying protective strip on one or both sides of the flanges. As shown in FIG. 3C, a strip 160 is adhered along the length of the flange on each side through which the apertures 159 are formed. Any number of tapes or adhesive strips may be suitably applied for this purpose.

With regard to anticipated service time, dampers constructed in accordance with the description provided herein are presently installed and undergoing testing under actual service conditions. At the time of this application, the first test specimens have already accumulated over 6,000 hours of service and show little evidence of either abrasion or chemical attack even though they are at least ten times lighter in weight than the conventional rubber dampers. While 6,000 hours already exceeds the maximum service life of the conventional rubber dampers, it is contemplated that the dampers of the present invention will accumulate substantially more service hours before eventual replacement is required.

The invention has been described herein in terms of several embodiments and constructions that are considered by the inventors to represent the best mode of carrying out the invention. It will be understood by those skilled in the art that various modifications, variations, changes and additions can be made to the illustrated embodiments without departing from the spirit and scope of the invention. These and other modifications are possible and within the scope of the invention as set forth in the claims.

I claim:

1. An abrasion resistant and chemical resistant damper for installation in the sludge transport section of a wastewater treatment system of the type having a damper inlet chute and a damper outlet chute and an interconnecting damper therebetween, the damper comprising:
    (a) a body having an inlet end and an outlet end defining a volume therebetween;
    (b) an inlet flange formed about the inlet end and an outlet flange formed about the outlet end; and
    (c) the body, inlet flange, and outlet flange formed from a fabric woven substantially of yarns of high performance material selected from the group consisting of aramid, ultra-high molecular weight polyethylene, and liquid crystal polymer.

2. The damper of claim 1 wherein the fabric comprises yarns having a denier of at least about 1000 d.

3. The damper of claim 2 wherein the fabric comprises aramid warp and fill yarns having a denier of about 3000 d and a yarn count of about 17 ends per inch warp and fill.

4. The damper of claim 1 wherein the fabric comprises a single woven layer having inner and outer sides.

5. The damper of claim 4 further comprising a leak prevention coating applied to at least one of the inner and outer sides.

6. The damper of claim 5 wherein the coating is selected from the materials consisting of acrylic, surlyn, polyurethane, and polyvinylchloride.

7. A sludge chute construction for a wastewater treatment system of the type having a sludge settling operation and a sludge processing operation, comprising:
    (a) a damper inlet chute for channeling sludge downwardly from a sludge settling operation, the sludge inlet chute having a discharge flange;

(b) an abrasion resistant and chemical resistant damper formed from a fabric woven substantially of yarns of high performance material selected from the group consisting of aramid, ultra-high molecular weight polyethylene, and liquid crystal polymers comprising:
  (i) a body having an inlet end and an outlet end defining a volume therebetween;
  (ii) an inlet flange formed about the inlet end and an outlet flange formed about the outlet end;
(c) a damper outlet chute for channeling sludge downwardly to a sludge processing operation, the sludge outlet chute having an inlet flange; and
(d) the inlet flange of the dam per connected to the discharge flange of the damper inlet chute, and the outlet flange of the damper connected to the inlet flange of the damper outlet chute.

8. The construction of claim 7 wherein the fabric comprises yarns having a denier of at least about 1000 d.

9. The construction of claim 8 wherein the fabric comprises aramid warp and fill yarns having a denier of about 3000 d and a yarn count of about 17 ends per inch warp and fill.

10. The construction of claim 7 wherein the fabric comprises a single woven layer having inner and outer sides.

11. The construction of claim 10 further comprising a leak prevention coating app lied to at least one of the inner and cuter sides.

12. The construction of claim 11 wherein the coating is selected from the materials consisting of acrylic, surlyn, polyurethane and polyvinylchloride.

* * * * *